(12) United States Patent
Campbell

(10) Patent No.: US 10,872,044 B1
(45) Date of Patent: Dec. 22, 2020

(54) DISTRIBUTED PROCESSING VIA OPEN RING BUS STRUCTURE

(71) Applicant: Rockwell Automation Technologies, Inc., Mayfield Heights, OH (US)

(72) Inventor: Alan J. Campbell, Mequon, WI (US)

(73) Assignee: Rockwell Automation Technolgies, Inc., Mayfield Heights, OH (US)

( * ) Notice: Subject to any disclaimer, the term of this patent is extended or adjusted under 35 U.S.C. 154(b) by 0 days.

(21) Appl. No.: 16/526,818

(22) Filed: Jul. 30, 2019

(51) Int. Cl.
*G06F 13/10* (2006.01)
*G06F 13/20* (2006.01)
*G05B 19/4155* (2006.01)

(52) U.S. Cl.
CPC ....... *G06F 13/102* (2013.01); *G05B 19/4155* (2013.01); *G06F 13/20* (2013.01); *G05B 2219/34274* (2013.01); *G06F 2213/0064* (2013.01)

(58) Field of Classification Search
None
See application file for complete search history.

(56) References Cited

U.S. PATENT DOCUMENTS

| | | | | |
|---|---|---|---|---|
| 9,859,741 B1 * | 1/2018 | Beagley | ............... | G08B 29/181 |
| 10,329,784 B1 * | 6/2019 | Corwin | ................. | E04H 4/1236 |
| 2002/0163513 A1 * | 11/2002 | Tsuji | ..................... | G06F 3/1446 |
| | | | | 345/204 |
| 2004/0024483 A1 * | 2/2004 | Holcombe | ............. | G06Q 30/02 |
| | | | | 700/122 |
| 2005/0192727 A1 * | 9/2005 | Shostak | .................. | B60C 11/24 |
| | | | | 701/37 |
| 2007/0223430 A1 * | 9/2007 | Desai | .................... | H04L 1/1854 |
| | | | | 370/338 |
| 2011/0003608 A1 * | 1/2011 | Forenza | ................... | H04B 7/01 |
| | | | | 455/501 |
| 2016/0094312 A1 * | 3/2016 | Fredriksson | .......... | H04L 1/0061 |
| | | | | 714/807 |
| 2017/0241200 A1 * | 8/2017 | Feldstein | .................. | E06B 9/68 |
| 2018/0276516 A1 * | 9/2018 | Ahn | ......................... | G11C 7/10 |
| 2019/0373532 A1 * | 12/2019 | Juhasz | .................. | H04W 12/00 |

* cited by examiner

*Primary Examiner* — Henry Tsai
*Assistant Examiner* — Aurangzeb Hassan
(74) *Attorney, Agent, or Firm* — Fletcher Yoder, P.C.

(57) ABSTRACT

Embodiments of this present disclosure may include a system that include multiple processing devices and an open ring communication bus communicatively coupled to each of the processing devices. Each processing device may use a control application to perform an operation on an industrial automation system. The control application of each processing device may output data related to the operation of the open ring communication bus during a respective timing interval used for communication via the open ring communication bus.

18 Claims, 13 Drawing Sheets

DISTRIBUTED PROCESSING VIA OPEN RING BUS STRUCTURE

BACKGROUND

This present disclosure relates generally to systems and methods for providing alternative ring bus structures within industrial automation systems. More particular, embodiments of the present disclosure are directed toward coupling processing modules to an open ring bus for improved communication between devices of the industrial automation systems.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Industrial automation systems may include automation control and monitoring systems. The automation control and monitoring systems may monitor statuses and/or receive information from a wide range of devices, such as valves, electric motors, a wide range of sensors, other suitable monitoring devices, or the like. One or more components of the automation control and monitoring systems, such as programming terminals, automation controllers, input/output (I/O) modules, communication networks, human-machine interface (HMI) terminals, and the like, may use the statuses and/or received information to provide alerts to operators to change or adjust operation of one or more components of the industrial automation system (e.g., such as adjusting operation of one or more actuators), to manage the industrial automation system, or the like.

The statuses and/or received information may relate to an operation of the industrial automation system and may be monitored by the automation control and monitoring systems. Certain communication systems are used to transmit the information to automation control and monitoring systems of the industrial automation systems. For example, devices of the industrial automation system may communicate with the automation control and monitoring systems via wired or wireless communication networks. With this in mind, it may be useful to improve methods for communication between automation control and monitoring systems and devices within industrial automation systems.

SUMMARY

A summary of certain embodiments disclosed herein is set forth below. It should be understood that these aspects are presented merely to provide the reader with a brief summary of these certain embodiments and that these aspects are not intended to limit the scope of this present disclosure. Indeed, this present disclosure may encompass a variety of aspects that may not be set forth below.

In one embodiment, a system may include multiple processing devices. Each processing device of the processing devices may include a control application that performs an operation on a respective industrial automation component. Additionally, the system may include an open ring communication bus communicatively coupled to each of the processing devices. Each processing device may track a timing interval of multiple time intervals. Furthermore, the control application of each processing device may communicate data related to the operation of the respective industrial automation component during the respective timing interval via the open ring communication bus.

In another embodiment, a tangible, non-transitory, computer-readable medium may include instructions that, when executed by a processor of a processing module that includes an input/output block, may cause the processor to transmit a first control signal that causes the input/output block to operate in a transmission operational mode for at least a portion of a first transmission interval. The instructions may also cause the processor to transmit, via the input/output block, a first dataset to an open ring communication bus while the input/output block operates in the transmission operational mode. The open ring communication bus may communicatively couple to multiple processing devices. Each processing device of the multiple processing devices may include a respective input/output block such that the multiple processing devices may receive the first dataset via the respective input/output block. The instructions may also cause the processor to transmit a second control signal to cause the input/output block to operate in a receive operational mode for at least a portion of a second transmission interval. The instructions may also cause the processor to receive, via the input/output block, a second dataset from the open ring communication bus to the input/output block while the input/output block is operating in the receive operational mode. The instructions may also cause the processor to transmit a synchronizing pulse to each of the processing devices via the open ring communication bus. The synchronizing pulse may cause each of the processing device to restart the first transmission interval.

In yet another embodiment, a system may include a first processing device and a second processing device. The first processing device may include input/output circuitry and a control application that performs an operation on at least a portion of an industrial automation system. The system may also include an open ring communication bus (ORC bus) communicatively coupled to the first processing device via the input/output circuitry. The first processing device may track a respective timing interval of multiple timing intervals and the control application may output data related to the operation on the at least a portion of the industrial automation system during the respective time interval.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
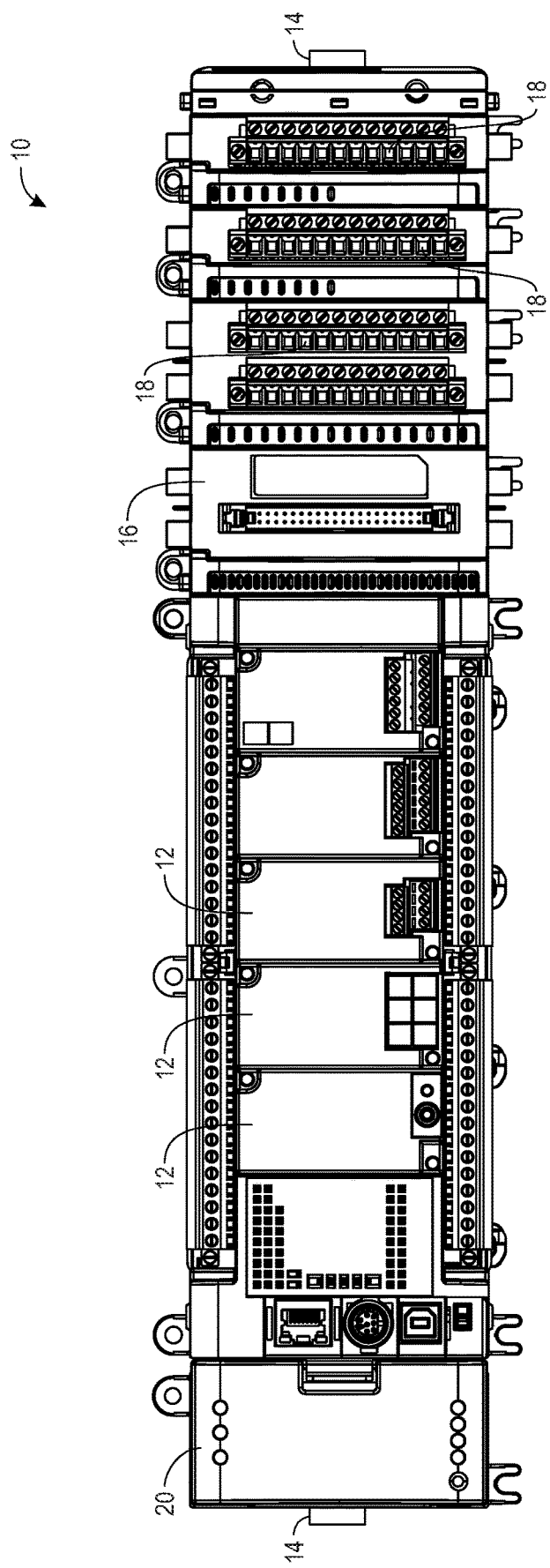
FIG. 1 is a perspective view of an example distributed processing system, in accordance with an embodiment.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. One or more specific embodiments of the present embodiments described herein will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this present disclosure.

The present disclosure is generally directed toward systems and methods that enable intercommunication between processing modules of a distributed processing system via an open ring bus. Processing modules may analyze data from sensors and information associated with an industrial automation system to determine statuses and/or control operations. In some systems, the processing modules couple to each other via a serially-coupled communication channel. In the serially-coupled communication channel, a first processing module may transmit data through additional processing modules before the data reaches a last processing module. The serially-coupled communication channel may add latencies into a total transmission time of the data. When a total transmission time between the processing modules increases, an overall responsiveness of an industrial control system that operates based on the processing modules may reduce. In this way, the industrial control system that uses data inflicted with this latency may be relatively less effective at performing control operations, or slower to respond to changes in operation of the industrial control system when compared to a system with lower or no latencies.

To reduce latencies, a ring bus communication network may interconnect the processing modules. While coupled in a ring bus communication network, the processing modules may output data onto the ring bus communication network for transmission by the other processing modules. When one of the processing modules outputs data onto the ring bus communication network, each of the other processing modules may receive the output data at the same time. In this way, the ring bus communication network may be characterized as a broadcast bus.

In some networks, the ring bus communication network may be a closed ring bus. The closed ring bus may cause signal reflections while transmitting data. The signal reflections may fade, reduce in strength, or dissipate over time. However, while active, the signal reflections may reduce signal integrity. A resonant frequency of the closed ring bus geometry may also affect signal integrity.

In contrast, some ring bus communication networks use an open ring bus. Processing modules coupled via the open ring bus may communicate with each other more efficiently than in a closed ring bus. For example, the open ring bus may enable higher frequency data transmission between processing modules relative to the closed ring bus. Performance may be additionally or alternatively increased by increasing a number of lanes interconnecting the processing modules. Increasing the number of lanes increases available transmission bandwidths used during communicate between modules.

Furthermore, the open ring bus may have additional benefits over other ring bus configurations, such as a closed ring bus. In particular, the open ring bus configuration may have improved signal integrity when compared to closed ring bus configurations.

Keeping the foregoing in mind, this present disclosure discusses various configuration examples for open ring bus configurations that interconnect processing modules and enable timely communications of data. It is noted that although described as discrete examples, any suitable combination of features or configurations described herein may be used together. Furthermore, as described herein, processing modules are given particular functions (e.g., control functions, power stage functions, analytics engine functions, programmable logic controller logic functions, or the like). However, it should be understood that any operation performed via a processing module may benefit from the open ring bus configurations described herein, and thus processing module operations should not be construed as limited to the operations described herein.

By way of introduction, FIG. 1 is a perspective view of an example distributed processing system 10. The distributed processing system 10 may be included within an industrial automation system to help perform operations, make control decisions, or the like. The distributed processing system 10 may be a processing system that uses one or more computing devices or processors to perform one or more operations. The distributed processing system 10 includes several processing modules 12 (e.g., processing devices). The processing modules 12 may interconnect with each other via a communication bus 14. The communication bus 14 is disposed on one side of the processing modules 12, and, although not depicted, is coupled to each of the processing modules 12 via a suitable backplane, input/output (I/O) circuitry, or the like.

Each of the processing modules 12 may perform one or more operations that contribute to an industrial control system operation and may include any combination of hardware circuitry and/or software-based operations. For example, one of the processing modules 12 may include a processor(s) and memory storing instructions readable by the processor to cause the processor to perform an operation of the one or more operations. Thus, the processing module 12 may include a tangible, non-transitory, computer-readable medium that stores instructions to cause the processing module 12 to perform an operation on an industrial automation system.

The processing modules 12 may perform control functions, power stage functions, analytics engine functions, programmable logic controller logic functions, or the like. Control functions may include operations that generate output control signals in response to one or more inputs. Control functions may use thresholds to define when a control signal is to be output in response to at least one input. Power stage functions may include operations that cause, in response to one or more inputs, a shutdown current output to power off the distributed processing system 10 and/or a component of the distributed processing system 10. In some cases, power stage functions may operate to provide or permit electrical signals to a load or other component coupled to a processing module 12 performing the power stage function. Analytics engine functions may include operations that receive inputs and analyze the inputs to determine a conclusion. Analysis of the inputs may include historic trending of inputs over time, comparison between input values, comparison between input values over time, or the like. The analysis may cause a processing module 12 to diagnose or detect abnormal operation in advance of a fault or other abnormal operation-related event. Programmable logic controller (PLC) logic functions may include operations that generate outputs to be used in PLC operations. These outputs may include control signals and/or data signals referenced by the PLC to determine when certain electric and/or mechanical components to close or open. Other suitable operations may be performed by one or more of the processing modules 12.

The distributed processing system 10 may also include an input/output block (I/O block) 16. The I/O block 16 may include termination points 18 where an input or an output communicative coupling may be secured. In the depicted example, the termination points 18 are screw-in terminations, where a screw-based coupling secures the input or output communicative coupling to a conductive terminal. Other types of terminations may be used, including plugs, clasps, or the like.

Each of the components of the distributed processing system 10 may be powered using electrical signals from a power supply 20. The power supply 20 may be coupled to a common power supply that supplies the electrical signals through a power bus onto each of the other components, or via another suitable electrical connection.

Figure 2:
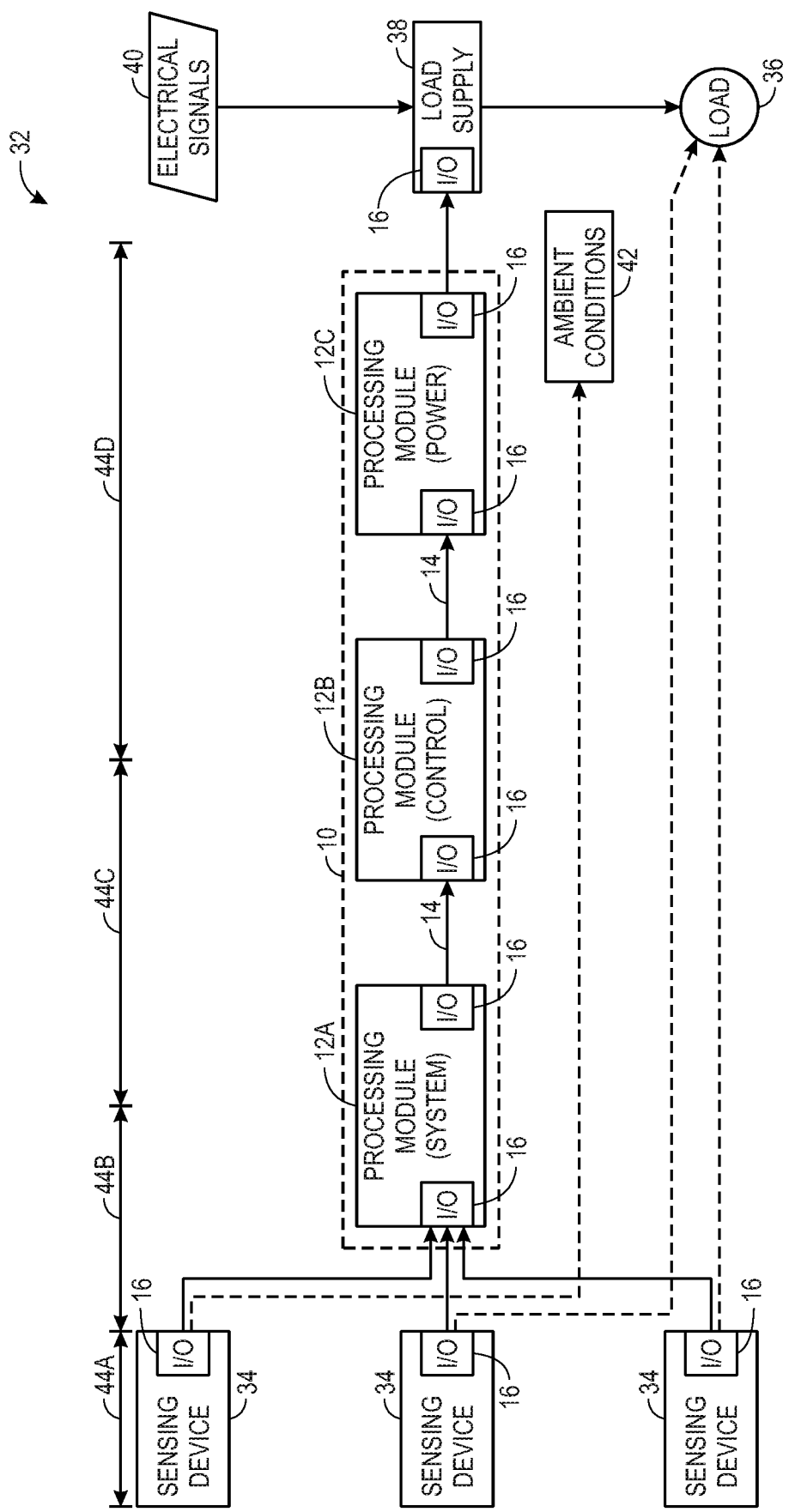
FIG. 2 is a block diagram of an example industrial automation system that includes the distributed processing system of FIG. 1, in accordance with an embodiment.

Some of the components of the distributed processing system 10 may be generalized in a block diagram. FIG. 2 is a block diagram of an example industrial automation system 32 that includes the distributed processing system 10. The industrial automation system 32 may include sensing devices 34 coupled to the distributed processing system 10. The distributed processing system 10 couples to a load 36 through a load supply 38. An output from the distributed processing system 10 may adjust operation of the load supply 38 to change operation of the load 36. For example, the distributed processing system 10 may determine to slow a rotation of a motor (e.g., load 36), and to do so, may indicate to the load supply 38 to reduce a frequency of electrical signal(s) 40 supplied to the motor as a control operation.

Although described as a motor, the load 36 may be a variety of suitable components. The components of the industrial automation system may include various industrial equipment loads such as mixers, machine conveyors, tanks, skids, specialized original equipment manufacturer machines, and the like. The components may also be associated with devices used by the equipment such as scanners, gauges, valves, flow meters, and the like. In one embodiment, every aspect of the component may be controlled or operated by a single controller (e.g., control system). In another embodiment, the control and operation of each aspect of the component may be distributed via multiple controllers (e.g., control system). As such, the processing modules 12 may control one or more aspects of the load 36.

Components (e.g., load 36, component loads, processing components) of the industrial automation system may be used within a corresponding cell, area, or factory to perform various operations for the respective cell, area, or factory. In certain embodiments, the components may be communicatively coupled to each other, for example via communication bus 14, to an industrial control system, or the like. Additionally, the industrial control system may also be communicatively coupled to one or more control systems that may monitor and/or control the operations of each respective cell, area, or factory.

As such, the industrial control system may be a computing device that may include communication abilities, processing abilities, and the like. For example, the industrial control system may at least partially include the processing modules 12 and/or may include a controller, such as a programmable logic controller (PLC), a programmable automation controller (PAC), or any other controller that may monitor, control, and operate an industrial automation device or component. The industrial control system may be incorporated into any physical device (e.g., the industrial automation components) or may be implemented as a stand-alone computing device (e.g., general purpose computer), such as a desktop computer, a laptop computer, a tablet computer, a mobile device computing device, or the like.

Industrial automation components may include a user interface, the industrial control system, a motor drive, a motor, a conveyor, and any other device that may enable an industrial automation system to produce or manufacture products or process certain materials. In addition to the aforementioned types of industrial automation components, the industrial automation components may also include controllers, input/output (I/O) modules, motor control centers, motors, human machine interfaces (HMIs), user interfaces, contactors, starters, sensors, drives, relays, protection devices, switchgear, compressors, network switches (e.g., Ethernet switches, modular-managed, fixed-managed, service-router, industrial, unmanaged, etc.), and the like. The industrial automation components may also be related to various industrial equipment such as mixers, machine conveyors, tanks, skids, specialized original equipment manufacturer machines, and the like. The industrial automation components may also be associated with devices used in conjunction with the equipment such as scanners, gauges, valves, flow meters, and the like.

The sensing devices 34 may sense parameters of the load 36 and/or of ambient conditions 42 of the load 36. The sensing devices 34 may acquire the sensed data and may output the sensed data to the processing modules 12 via I/O blocks 16. The sensed data may be of any suitable format, and thus may include one or more analog electrical signals, digital data signals, pulse-width-modulated data signals, or the like. Furthermore, the I/O blocks 16 may be outfitted for wireless communication in addition to or instead of wired communication. Thus, the sensed data may sometimes be transmitted to the distributed processing system 10 via wireless and/or radio frequency signals.

After the distributed processing system 10 receives the sensed data from the sensing devices 34, the respective processing modules 12 within the distributed processing system 10 may analyze the sensed data to determine one or more outputs to send to the load supply 38. It may be desired for latencies of data transmissions to be reduced such that the outputs sent to the load supply 38 are indicative of a real-time response (e.g., within milliseconds) to data sensed by the sensing devices 34.

With this in mind, the distributed processing system 10 illustrated in FIG. 2 may incur various latencies in the sensed data transmission, as depicted in 44A, 44B, 44C, and 44D. For example, a latency 44A may incur during sensing and preparation of the sensed data for output to the distributed processing system 10. A latency 44B may incur due to the transmission between the sensing device 34 and a first processing module 12A. A latency 44C may incur due to a processing and transmission delay between the first processing module 12A and the second processing module 12B, and then again (e.g., latency 44D) between the next pair of processing modules 12. Thus, by the time the output is transmitted from the last processing module 12C to the load supply 38, a non-negligible amount of latency may afflict a response of the industrial automation system 32. However, these undesirable transmission latencies may be reduced by employing an open ring communication bus as described herein.

Figure 3:
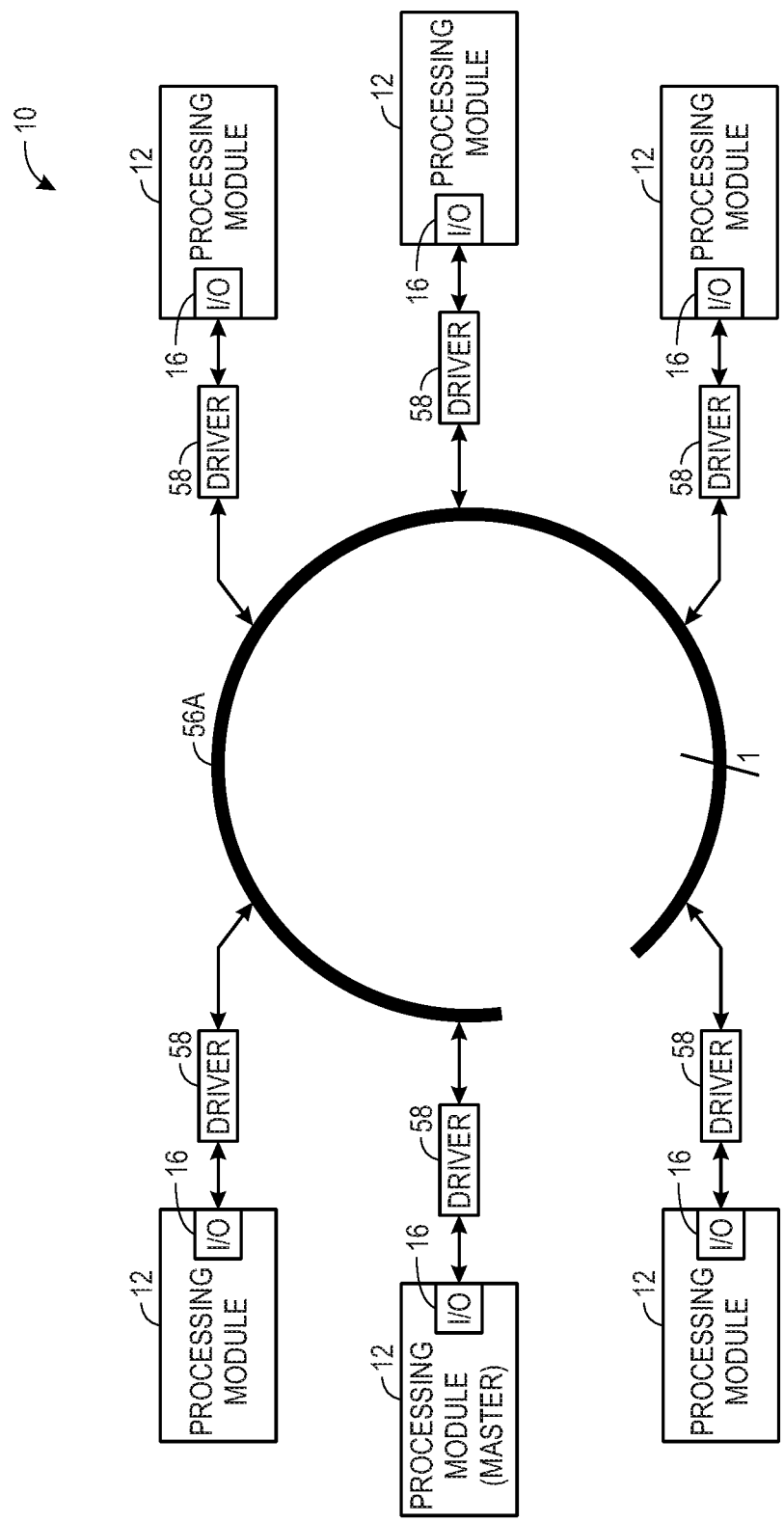
FIG. 3 is a block diagram of an open ring bus, where the open ring bus is a third example distributed processing system of the industrial automation system, in accordance with an embodiment.

FIG. 3 is a block diagram of an open ring communication bus (ORC bus) 56A with the distributed processing system 10. Within this disclosure, different examples of the ORC bus 56A are depicted as described as ORC bus 56B, 56C, 56D, and so on. It should be understood that features of these ORC buses are not mutually exclusive and may be suitably combined. Although not depicted, it should be understood that some of the processing modules 12 may couple to sensing devices (e.g., sensing devices 34), load supplies (e.g., load supply 38), or other components as part of the industrial automation system 32. For ease of description, processing and inter-handling of data between the processing modules 12 are highlighted herein to describe how latencies are reduced within the operations of the distributed processing system 10. It is noted that when latency is reduced within the operations of the distributed processing system 10, latencies of the industrial automation system 32 may be reduced as a whole, permitting for a more efficient and responsive operation.

The ORC bus 56A may be a transport layer able to support transmission of a variety of data (e.g., messages, data packets), including encrypted data or unencrypted data. The handling of the data, such as the decryption of the data or processing of the data, may be handled by different software and/or configurations stored within the processing module 12. In this way, the ORC bus 56A may be a broadcast communication bus. When data is output to the ORC bus 56A, each processing module 12 may receive the data at a substantially similar time. Moreover, each processing module 12 may receive the data relatively faster than when using the communication bus 14 of FIGS. 1 and 2 that experience communication latencies caused at least in part by the serial transmission of data through the respective processing modules 12. Data transmitted via the ORC bus 56A may include any suitable type of message (e.g., message constructs) and/or may include any suitable type of data format (e.g., integer data, floating point data).

During a time segment assigned to the processing module 12, the processing module 12 may transfer data during the assigned time segment onto the ORC bus 56A. Each processing module 12 may track the time segments. In some embodiments, a master processing module 12 may control when each child processing module 12 enters or exits a transmission operational mode to prepare for its assigned time segment. Each of the processing modules 12 may couple to the ORC bus 56A through a driver 58. The driver 58 may convert data from a respective processing module 12 into a common data format interpretable by the drivers 58. In some embodiments, the driver 58 may use low voltage differential sensing signals and communicate via a standard format such as RS-485 standard or other suitable communication standard. In some cases, a cross-point switch may be used as the driver 58. For example, an ORC bus 56A operating at a 1 gigahertz (GHz) frequency may use a cross-point switch as the driver 58.

During the assigned time segment, the driver 58 of the transmitting processing module 12 (e.g., processing module 12 assigned to the current time segment) operates in a transmission operational mode to enable data transmission onto the ORC bus 56A. The driver 58 operating in the transmission operational mode may change one or more operations to permit transmission of the data onto the ORC bus 56A. For example, input/output circuitry of the driver 58 may change states to permit output of data, such as instead of an input of data.

While the transmitting driver 58 is in the transmission operational mode, each of the other drivers 58 operate in a receive operational mode. While in the receive operational mode, the processing modules 12 may receive the information transmitted via the transmitting driver 58. Transmitting data in this way may reduce latencies since data transmits directly to each processing module 12 instead of through sequentially-coupled processing modules 12. Furthermore, latencies may be even further reduced in operations where a processing module 12 uses data generated from multiple other processing modules 12 to make a control decision. The ORC bus 56A enables processing modules 12 to receive each output in a more efficient and faster manner than the previously described communication bus 14 (e.g., serially-coupled communication channel) because data latencies associated with transmitting data between the processing modules 12 are reduced.

I/O blocks 16 may also be configurable to operate in the receive operational mode and/or the transmission operational mode. To do so, the master processing module 12 may transmit a control signal to each of the processing modules 12 to change the operation of the I/O blocks 16. Furthermore, in some cases, each of the processing modules 12 may individually manage the operation of its corresponding I/O block 16 such that the master processing module 12 does not need to transmit a control signal to each of the I/O blocks 16 and/or processing modules 12 to initiate the configuration change of the I/O blocks 16.

Figure 4:
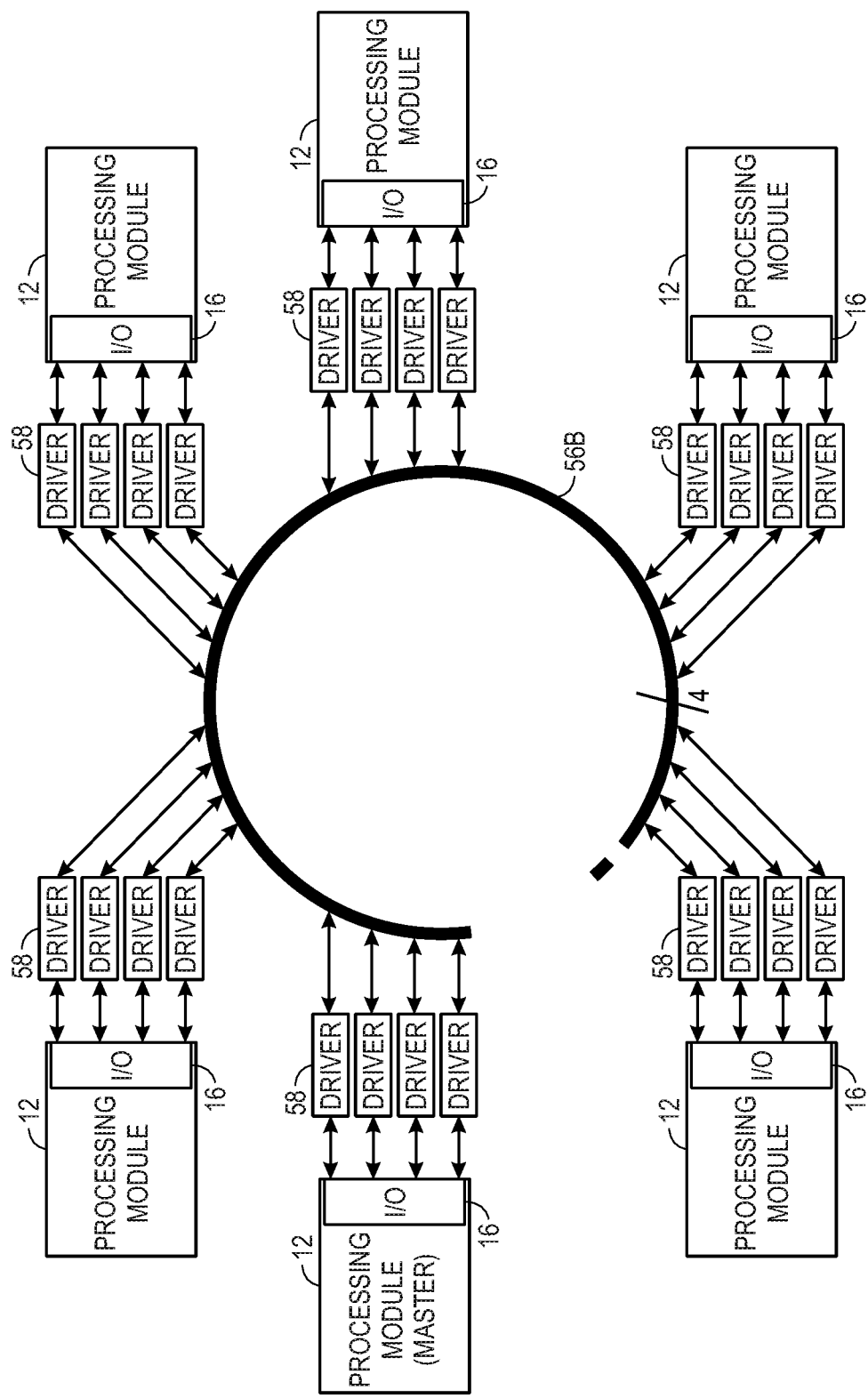
FIG. 4 is a block diagram of a first example of the open ring bus of FIG. 1, in accordance with an embodiment.

The ORC bus 56A may also scale easily when compared to other communication networks (e.g., serially-coupled communication channel). As is detailed via FIGS. 5-13, the ORC bus 56A may have any suitable number of communication rings, communication lanes, and may use any suitable frequency of transmission to adapt to a wide variety of control applications. The ORC bus 56A may include a single ring with a single lane communication bus. When the ORC bus 56A includes a single ring bus, a single data bit may transmit between the processing modules 12 (e.g., single bit serial data transfer). As lanes and/or rings are added to the ORC bus 56A, additional bits and communication techniques may be used. For example, FIG. 4 depicts an example of a single ring, four lane ORC bus 56B that uses parallel bit transmission to transmit data between processing modules. Bandwidth of the ORC bus 56 may be determined according to Equation 1 and/or Equation 2.

$$\text{bandwidth}_{(1\ lane)} = \text{time period} * (\text{clock frequency}) * 2 \quad [1]$$

$$\text{bandwidth}_{(total)} = \text{bandwidth}_{(1\ lane)} * (\text{number of lanes}) \quad [2]$$

To illustrate how bandwidth might be calculated, if each processing module 12 is allocated 21 microseconds (μs), during the general transfer time period 76 and use a frequency of 650 megahertz (MHz) as the communication frequency, about 54.6 bits of data may be transmitted during one time period 72.

As described above, the ORC bus 56A may be used in a variety of design variations. FIG. 4 is a block diagram of a second example of the ORC bus 56B depicting a one ring, four lane configuration. Each processing module 12 may couple to the ORC bus 56B via four drivers 58. Each driver 58 may couple to a lane. Since there are four separate lanes (e.g., individual communication channels) interconnecting the processing modules 12, multiple processing modules 12 may communicate at a time. For example, a first processing module 12 may transmit using single bit serial transmission via the ORC bus 56B, while a second processing module may transmit using dual bit parallel transmission via the ORC bus 56B.

When using the ORC bus 56B, for example, the data may be transmitted between processing modules 12 at a rate of 50 MHz frequency (or another relatively low frequency). Using a programmable device (e.g., field programmable gate array) to coordinate transfer of data to or from the ORC bus 56B may provide suitable utilization of the ORC bus 56B. The programmable device may be leveraged for offloading the processing of the processing module 12 at an improved efficiency relative to using a Serial Peripheral Interface (SPI), such as within each driver 58 or within an input/output (I/O) block (as described later). In some embodiments, the programmable device might enable data transmissions at frequencies between 500 MHz and 650 MHz. At these frequencies, a four lane ORC bus 56B operated in a single data rate (SDR) transport mode (e.g., one bit of data is transmitted at a clock transition) may support data transfers up to 2.6 gigabytes per second (Gbps). However, the ORC bus 56B operated in a double data rate (DDR) transport mode (e.g., two bits of data is transmitted at a clock transition) may support data transfers of up to 5.2 Gbps. To increase performance further, additional lanes may be added and/or programmable devices capable of operating to transmit data at higher data transmission frequencies may be used.

Figure 5:
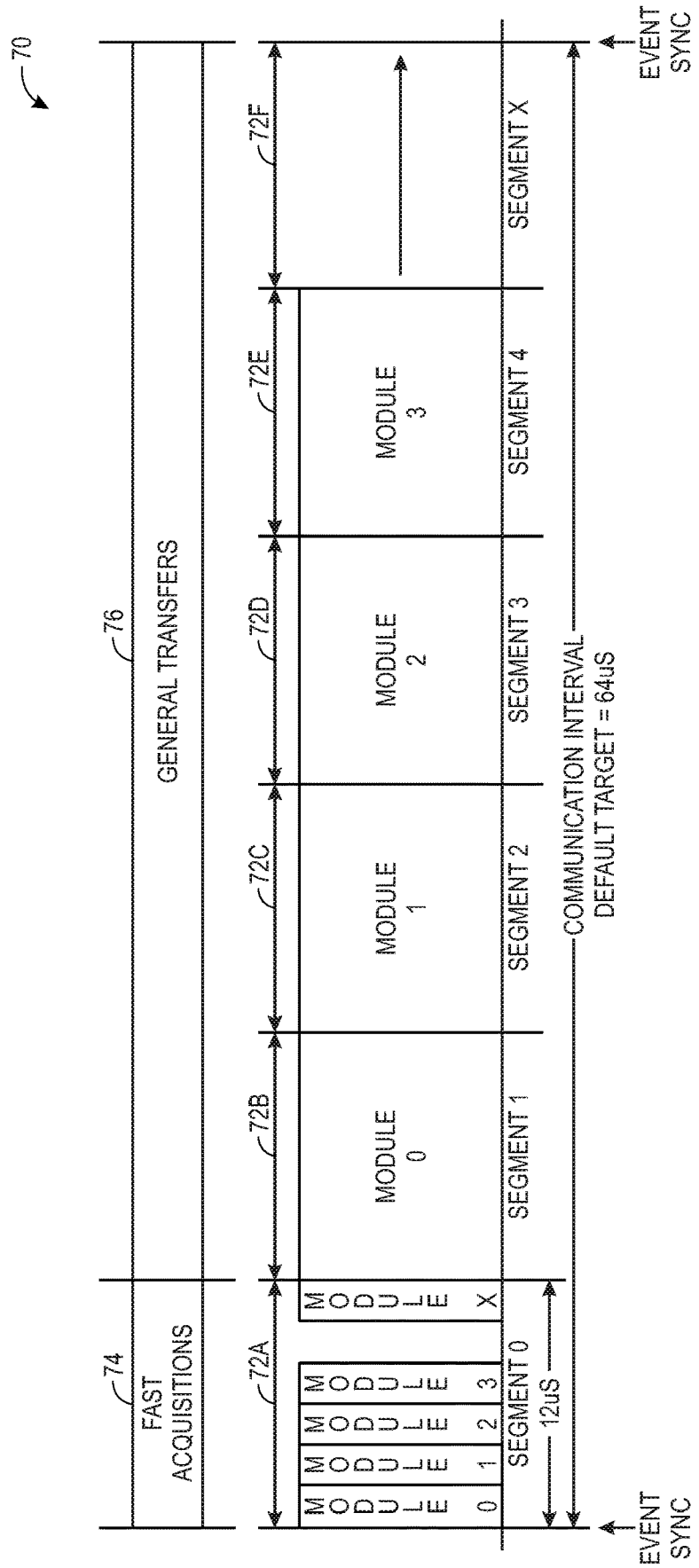
FIG. 5 is an illustration of a communication interval used by a master node of the open ring bus of FIG. 3 when communicating with child nodes of the open ring bus, in accordance with an embodiment.

Elaborating further on the time segment and transmission management of the ORC bus 56B, FIG. 5 is an illustration of an example communication interval 70 (e.g., time interval, timing interval) used to coordinate transmissions of each processing module 12 to the shared ORC bus 56B. These timing durations may be managed by a central controller, such as a master processing module 12, and/or by each processing module 12 via timing and/or logic circuitry that tracks the durations. In this example, the communication interval 70 equals 64 μs, however, it should be understood that any time duration may be used as the communication interval.

Each processing module 12 may use a portion of the communication interval 70 for its respective data communication operations. The respective data communication operations of each processing module 12 may include fast communication operations and general communication operations. In this way, a subset of portions of the communication interval 70 may correspond to fast communication operations while another subset of portions of the communication interval 70 may correspond to general communication operations. Data to be transmitted via the ORC bus 56 may be associated with a relatively urgent or fast communications or a relatively less urgent or general communication. For example, data that is to be used with a sensed data input to determine a control operation to be transmitted via the ORC bus 56 may be transmitted during the fast communication operations.

The communication interval 70 may be split into any suitable number of time periods 72 of any duration of time. In one embodiment, the communication interval 70 is divided into six equi-duration time periods 72. The first time period 72A corresponds to a fast acquisition time period 74 (e.g., corresponding to fast communication operations). The fast acquisition time period 74 may be used for immediate data transfer, relatively urgent communications, prioritized messages, short data transmissions, or the like. Thus, one of the processing modules 12 may transmit data for a shorter duration of time during the fast acquisition time period 74. Receiving processing modules 12 may receive data transmitted during the fast acquisition time period 74 at a relatively earlier time than data during a general transfer time period 76 (e.g., corresponding to general communication operations). The second time period 72B through the last time period 72F create the general transfer time period 76. Data transmitted during the general transfer time period 76 may include data that is less critical to be received quickly or earlier than other data. The transmission of the general transfer time period 76 may be described as a less prioritized transmission, a longer data transmission for larger amounts of data, or the like. For example, data transmitted via during fast acquisition time period may be categorized as a having a higher priority relative to other sets of data generated by a respective processing device 12.

In some embodiments, an example processing module 12 may transmit data used to determine a first processing operation during the fast acquisition time period 74, and may transmit data used as an input in a second control operation during the general transfer time period 76 (as to reduce latencies incurred by the first control operation waiting for the data). It is noted that ratios comparing transmitting duration of times to a total duration of time for the given time period (e.g., ratio of time comparing durations of time for the fast acquisition time period 74 and the general transfer time period 76) for any given processing module 12 controlled via the communication interval 70 may be equal (e.g., at least proportional in time) between the fast acquisition time period 74 and the general transfer time period 76.

Generally, the fast acquisition time period 74 (e.g., the first time period 72A) may be divided into an x-number of equal time periods corresponding to a number of processing modules that transmit data onto the ORC bus 56. A duration of the time periods 72 may be determined via to Equation 3.

$$\text{time period} = \frac{\text{communication interval}}{\text{number of processing modules} + 1} \quad [3]$$

Equation 3 illustrates the relationship between the time period 72, the communication interval (e.g., communication interval 70 equals 64 μs in this example), and a number of processing modules 12. For purposes of illustration, take the number of processing modules 12 to equal four such that each of the time periods 72 may then equal 12.8 μs (e.g., 64 μs/5). The fast acquisition time period 74 may also equal 12.8 μs, thus each processing module 12 may have about 3 μs (e.g., 12.8 μs/5) to transmit data onto the ORC bus 56. During the general transfer time period 76, more time is allocated for data transmission per processing module 12. In this example, about a six times longer time duration is provided to each processing module 12 to transmit data during the general transfer time period 76 than during the fast acquisition time period 74.

To help manage synchronization of processing modules 12, drivers 58, and timing expectations, at the beginning of each communication interval 70, an "event sync" operation may be performed that uses a synchronizing pulse to restart communication operations of the processing modules 12. For the event sync operation to occur, a master processing module 12 may transmit an interrupt command to each child processing modules 12. The interrupt command may be transmitted via the ORC bus 56, via a direct communicative coupling to each processing module 12, or the like. When the interrupt command is received by the children processing modules 12, the children processing modules 12 may reset operations and prepare for a next communication interval 70. This may include preparing data for transmission, preparing to receive data, performing a sensing operation, or the like.

In some examples, the drivers 58 may automatically change between the transmission operational mode and the receive operational mode. Control circuitry of the driver 58 and/or of the processing module 12 may cause the automatic change by instructing the driver 58 to change its operational mode. The time or instance to change operational mode may be determined based on the time periods 72. In some embodiments, timer circuitry and/or counters may be used to track time periods 72. In coordination with the timer circuitry and/or counters, the master processing module 12 may initialize the children processing modules 12 and/or the drivers 58 of the children processing modules 12 to reset the timer circuitry and/or counters to zero or a neutral state. The initialization may also establish a length of time for each time period 72 and each sub-time period of the fast acquisition time period 74 within circuitry of the driver 58 and/or the processing modules 12 by programming the timer circuitry and/or counters with the particular intervals. In some cases, after the initialization operation, the processing modules 12 may operate in accordance with the communication interval 70 and the event sync operations.

Figure 6:
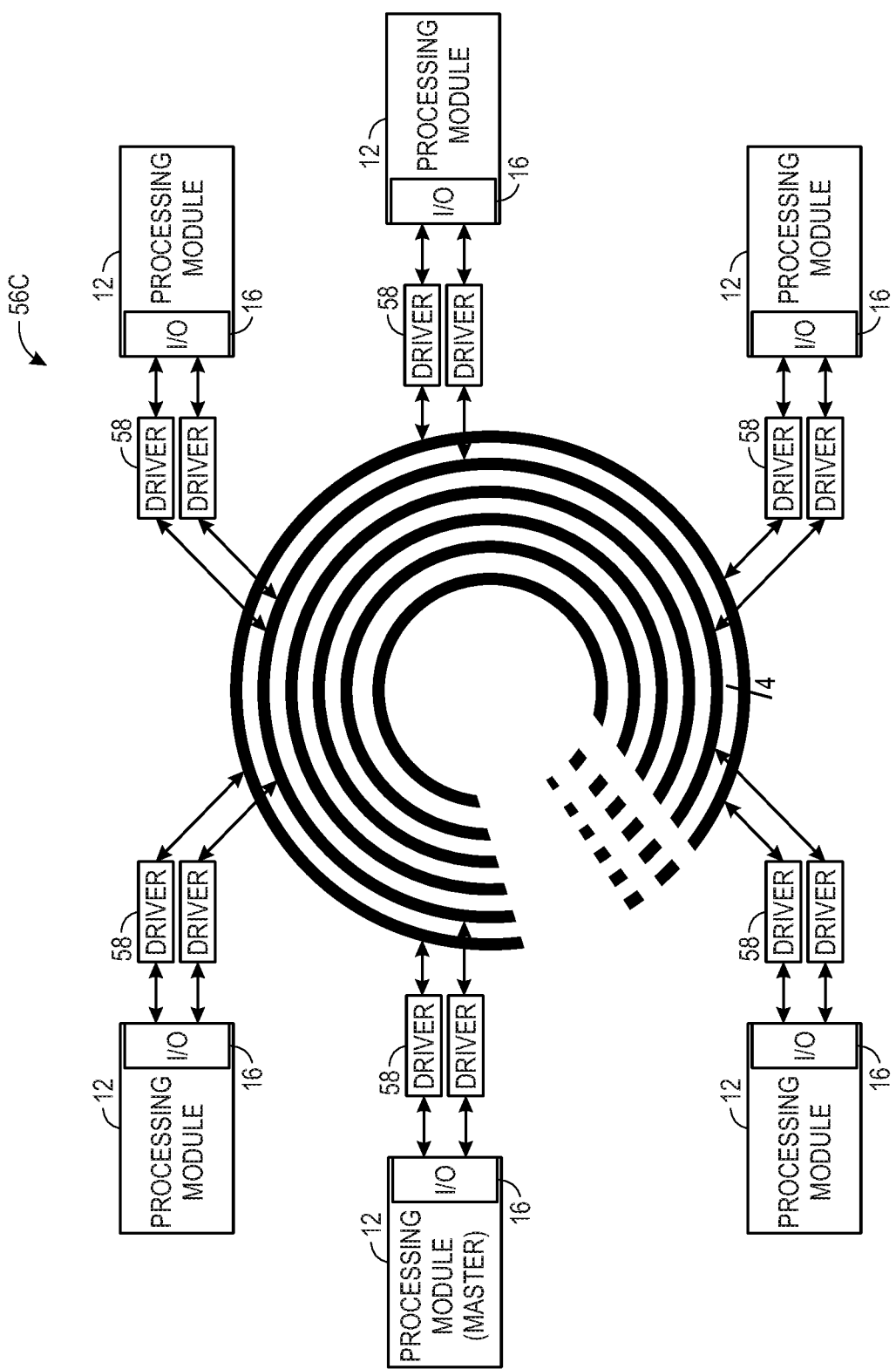
FIG. 6 is a block diagram of a second example of the open ring bus of FIG. 1, in accordance with an embodiment.

FIG. 6 is a block diagram of an example ORC bus 56C. The ORC bus 56C includes six rings, where each ring includes four lanes. The ORC bus 56C may move six times more data per communication interval 70 than the ORC bus 56B since the ORC bus 56B has one ring while the ORC bus 56B has six rings. In some cases, the processing modules 12 may couple to each lane of each ring through drivers 58, thus permitting each processing module 12 to send and receive data from the twenty-four lanes of the ORC bus 56C.

In each of the examples shown in FIG. 3, FIG. 4, and FIG. 6, the processing modules 12 may use addresses to track data on the ORC bus 56 and/or time periods 72. The address may also identify an origin of the data and/or a destination for the data. In this way, the processing module 12 may interpret an address of data to help determine whether to discard the data or use the data in an operation. Three addressing methods are discussed with this present disclosure, but it should be noted that other addressing methods may be combined with the ORC bus 56 system and methods. The three addressing methods described below include fixed addressing, direct communication addressing, and clocked bit addressing.

Figure 7:
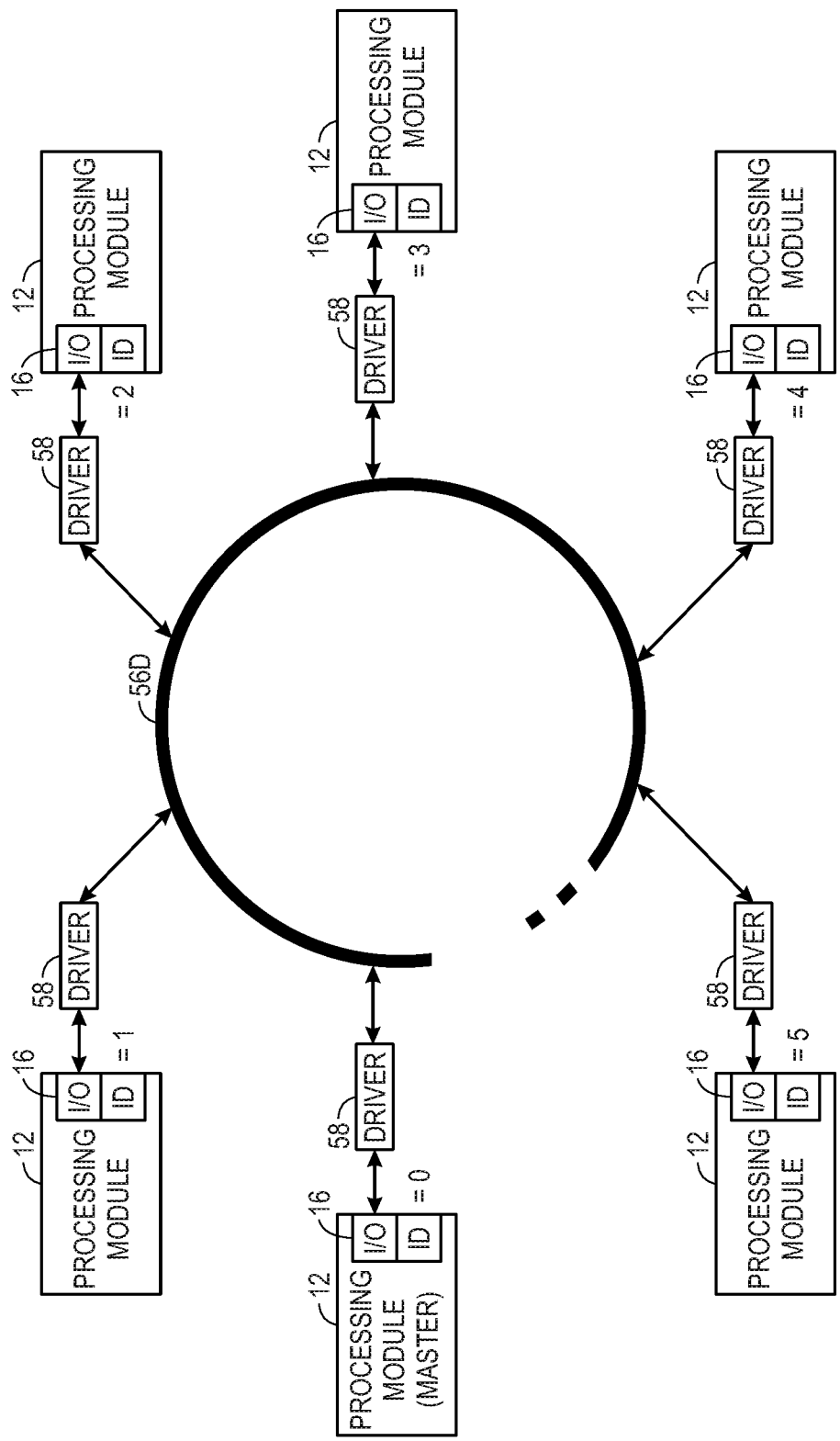
FIG. 7 is a block diagram of a third example of the open ring bus of FIG. 1, in accordance with an embodiment.

As another example, FIG. 7 is a block diagram of an example ORC bus 56D that uses fixed addressing. In fixed addressing operations, each processing module 12 corresponds to a fixed address. For example, the master processing module 12 corresponds to a fixed address equal to 0 (e.g., ID=0). When using fixed addressing to identify data transmitted from a processing module 12, at least two lanes may be used in the ORC bus 56D. The first lane may be used to transmit a single data bit, and the second lane may be used to transmit a processing module 12 identifier. The number of lanes may increase as a number of processing modules 12 increases since a number of bits used to represent an identifier for a processing module 12 may increase as the number of processing modules 12 increases. For example, in a distributed processing system 10 that has two processing modules 12, the first processing module 12 may be identified with a 0-bit while the second processing module 12 may be identified with a 1-bit. As soon as the number of processing modules 12 increases to three, two bits may be used to identify the processing module 12. Depending on the system configuration of the distributed processing system 10 and/or the ORC bus 56D, the two bits may be transmitted serially via a single lane or via two lanes in parallel. Latency may be further reduced if the identifying bits are transmitted in parallel via multiple lanes.

The processing module 12 may output its data and its identifier to the other processing modules 12 during its assigned transmission durations of the communication interval 70 (e.g., one of the time periods 72 of the general transfer time period 76 and its assigned duration of the fast acquisition time period 74). When the processing modules 12 receive the data and the identifier, the processing modules 12 may interpret the identifier to determine which other processing module 12 transmitted the data. After determining which processing module 12 transmitted the data, the processing modules 12 may individually determine whether or not to use the data received (e.g., based on respective software and/or hardware configurations or operations). Similar to the previously discussed examples, one or more drivers 58 may be included per processing module 12 based on specific hardware of the driver 58 and a number of lanes and/or rings of the ORC bus 56D.

Figure 8:
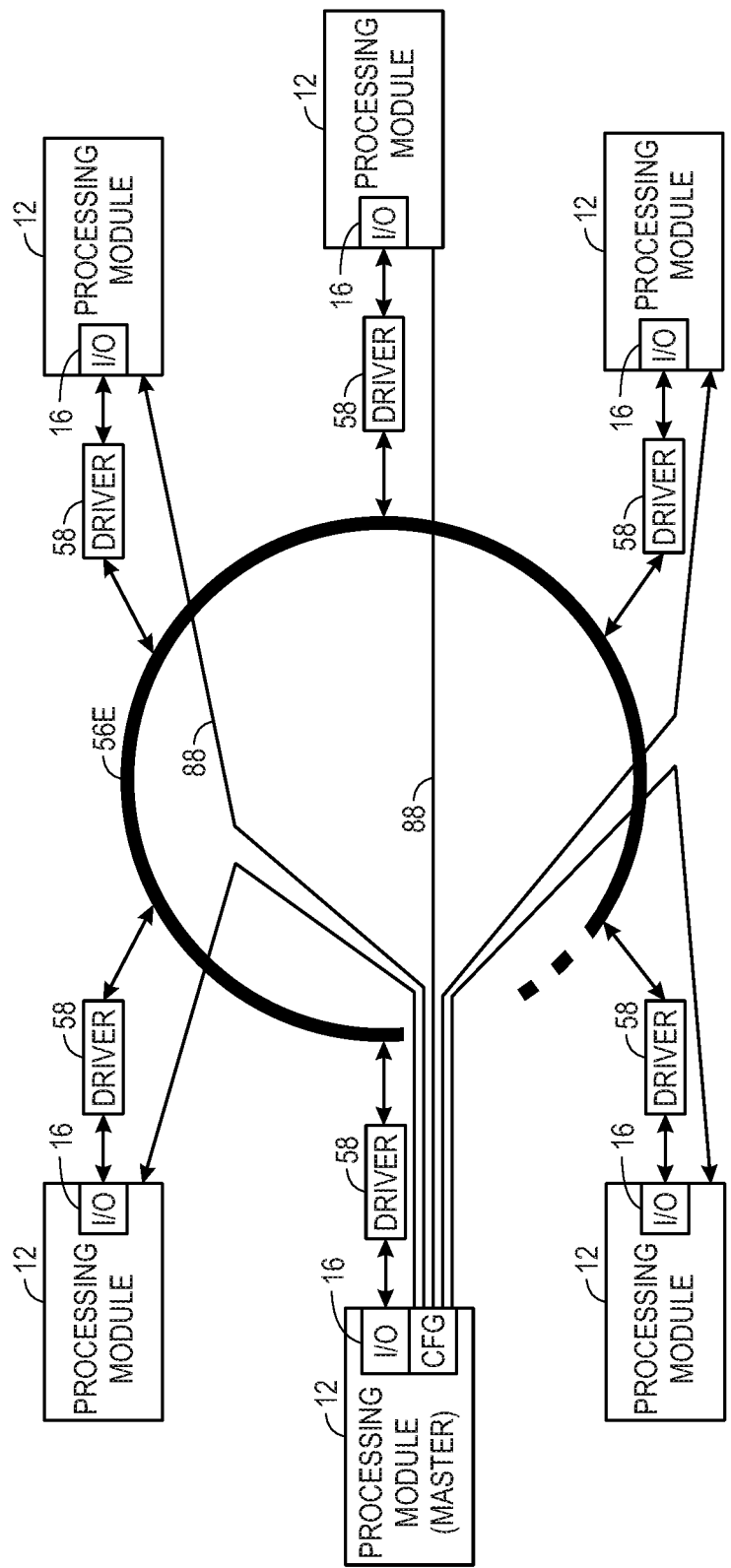
FIG. 8 is a block diagram of a fourth example of the open ring bus of FIG. 1, in accordance with an embodiment.

The processing modules 12 may additionally or alternatively be addressed via direct communication addressing and/or clocked bit addressing. FIG. 8 is a block diagram of an example ORC bus 56E that uses direct communication addressing. In this example, the master processing module 12 communicatively couples to each other processing module 12 via direct communication links 88. The master processing module 12 may transmit identifying information to each processing module 12 to identify the transmitting processing module 12. The master processing module 12 may generate the identifying information via a configuration block 89 of the processing module 12. Similar to the example ORC bus 56D, any number of lanes and/or rings may be used in combination with the direct communication addressing operations.

During the communication interval 70, when one of the processing modules 12 broadcasts data via the ORC bus 56E, the master processing module 12 may also identify the broadcasting processing module 12 via the direct communication links 88. The identifier data may be a single bit, or multiple bits. Furthermore, the direct communication links 88 may be one or more communicative couplings, as to permit serial or parallel transmission of the identifier. The identifier may be transmitted at the same time of, before, during, or after a start of the broadcast of data from the processing module 12 to the ORC bus 56E. In other words, the identifier may be transmitted at any suitable time as long as the processing modules 12 are able to identify which processing module 12 generated the received data.

In some embodiments, the master processing module 12 may change how data is transmitted onto the ORC bus 56E by repeating an initialization of the distributed processing system 10 and/or changing configurations of the processing modules 12. The change may include reassigning lanes to processing modules 12 to change which processing modules 12 are assigned to transmit data via which lanes. Other changes may include changing a transmission frequency or other transmission characteristics. In a similar way, the processing modules 12 may change the lanes used to transmit data between the fast acquisition time period 74 and the general transfer time period 76. For example, a processing module 12 may use one lane during the fast acquisition time period 74 but four lanes during the general transfer time period 76. The master processing module 12 may configure the processing modules 12 via direct programming and/or direct alternation via the direct communication links 88. Settings or configuration may be transmitted via the direct communication links 88 and implemented within one or more of the processing modules 12.

Figure 9:
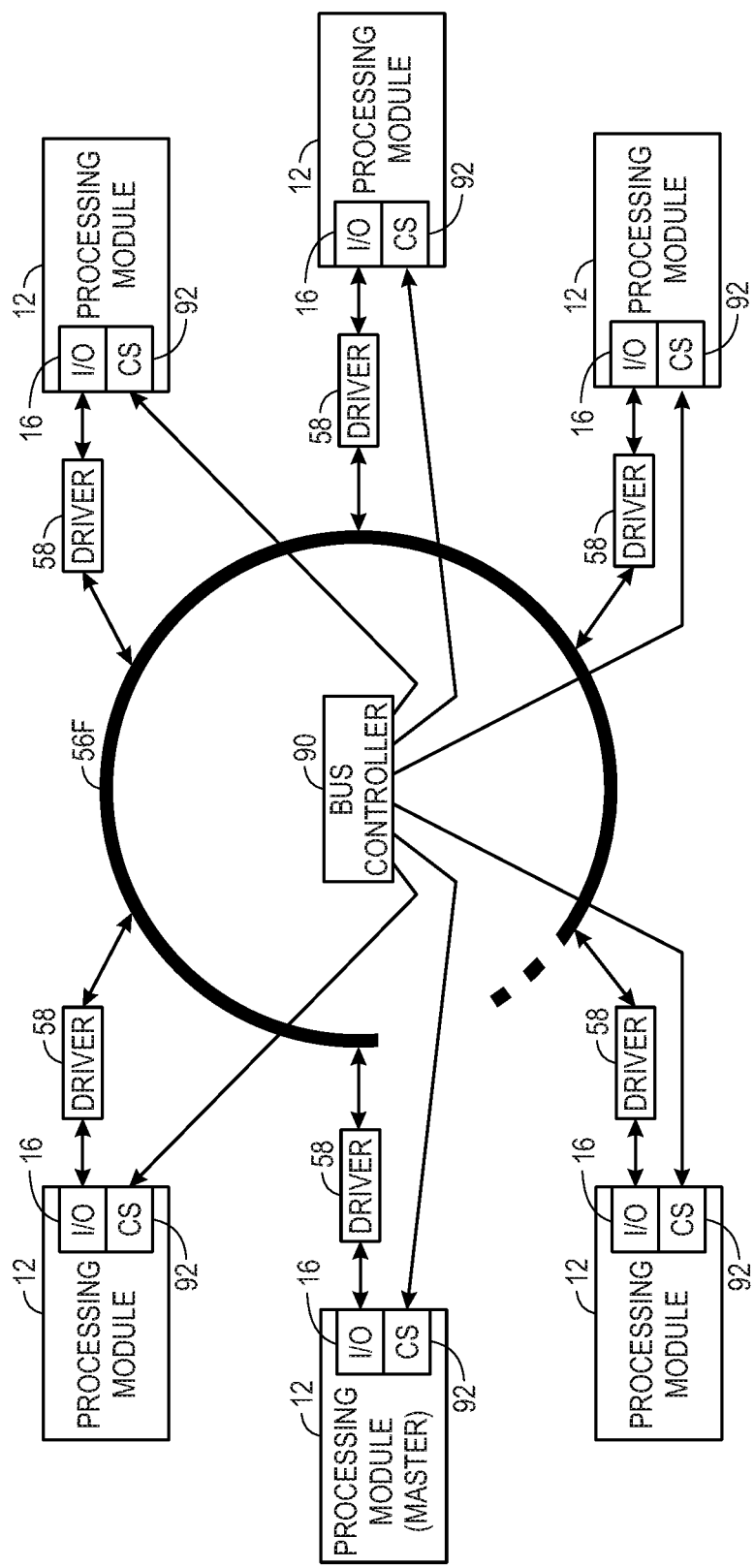
FIG. 9 is a block diagram of a fifth example of the open ring bus of FIG. 1, in accordance with an embodiment.

FIG. 9 is a block diagram of an example ORC bus 56F that uses direct addressing. The ORC bus 56F includes many of the same components described previously in addition to a bus controller 90 and control signal (CS) ports 92 with each of the processing modules 12. The ORC bus 56F is an example of direct module addressing methods managed by the bus controller 90. To operate the ORC bus 56F, the master processing module 12 may control which of the processing modules 12 access the ORC bus 56F. The bus controller 90 may send a signal to a child processing module 12 to initiate communication via the ORC bus 56F in response to a received request from the master processing module 12. In some embodiments, the bus controller 90 may also cause the child processing module 12 to stop communicating with the ORC bus 56F. In this way, the bus controller 90 manages the timing intervals on behalf of each of the processing modules 12.

To elaborate further, the synchronizing pulse (described previously with respect to FIG. 5) may align the master processing module 12 and the children processing modules 12 to the beginning of the communication interval 70 (e.g., start of the fast acquisition time period 74). The master processing module 12 may transmit a sequentially generated control signal to each of the CS ports 92 during the fast acquisition time period 74. In this way, each child processing module 12 is permitted to transmit data via the ORC bus 56 during the fast acquisition time period 74. Each processing module 12 may be allocated time for transmission of data during the fast acquisition time period 74. After the fast acquisition time period 74 and during the general transfer time period 76, the master processing module 12 may permit each processing module 12 to have additional time to transmit data via the ORC bus 56F. During the general transfer time period 76, the processing modules 12 may transmit one or more messages with identifying data. At the end of the general transfer time period 76, each processing module 12 may receive the synchronizing pulse and restart operations.

Figure 10:
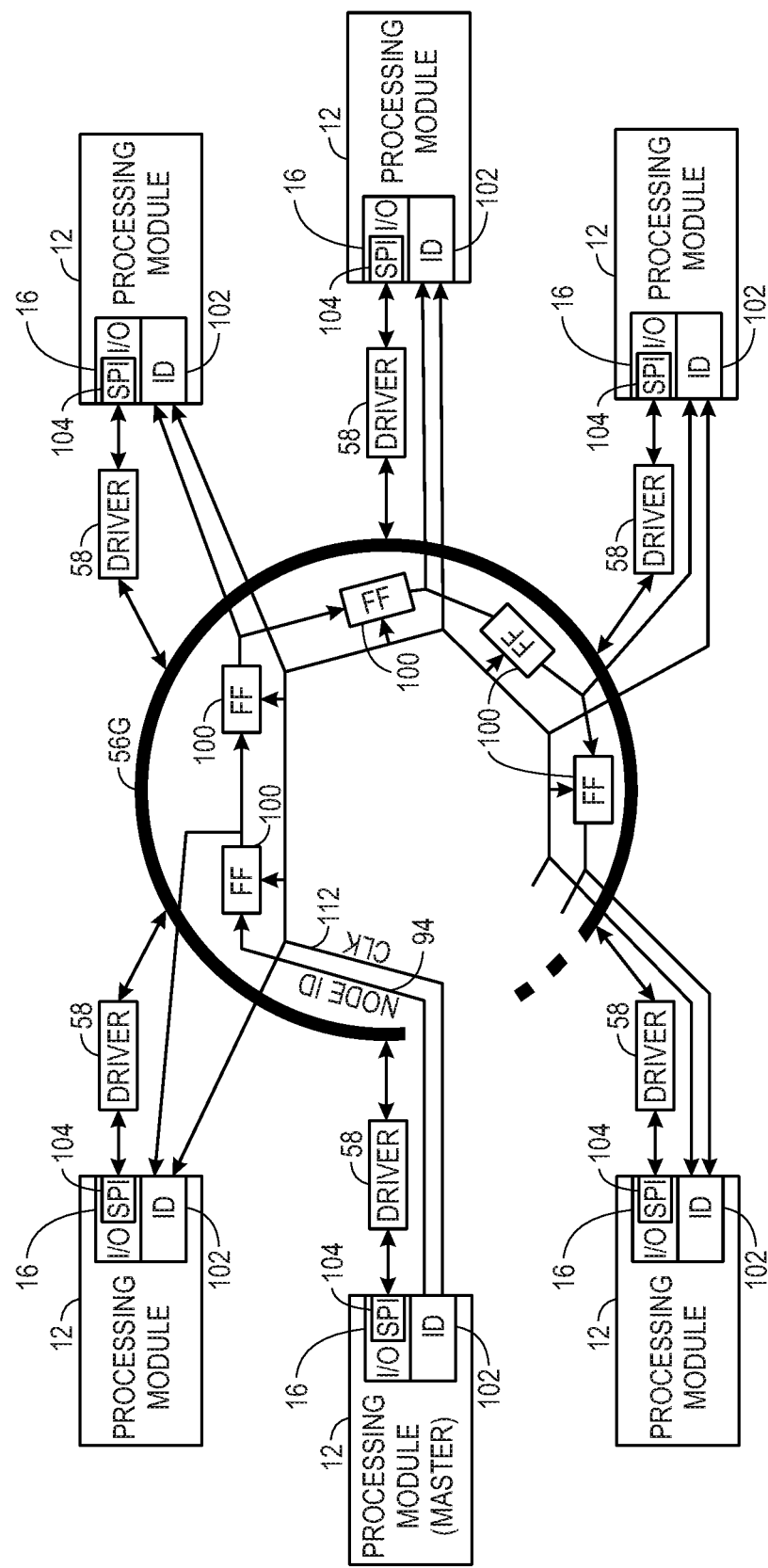
FIG. 10 is a block diagram of a sixth example of the open ring bus of FIG. 1, in accordance with an embodiment.

FIG. 10 is a block diagram of an example ORC bus 56G that uses clocked bit module addressing. The ORC bus 56G uses a clocked identifier to address the data sent via the ORC bus 56G. Each processing module 12 may count clock transitions transmitted from the master processing module 12 (e.g., as clock (CLK)). On power up or initialization of the distributed processing system 10, the master processing module 12 may clock a logical high data bit via a node identifier bus 94 (e.g., as DATA) coupled between flip flop circuitry 100 and an identification (ID) terminal 102. The other processing modules 12 may read the identifier using outputs from the master processing module 12 via the ID terminal 102. The identifier may indicate to the processing module 12 which data source is associated with an ongoing data transmission. The flip flop circuitry 100 may propagate the identifier to the next processing module 12.

During operation, each processing module 12 monitors the node identifier bus 94 for when the output from its corresponding flip flop circuitry 100 is a logical high signal (e.g., output=1). When the output from the corresponding flip flop circuitry 100 is a logical high signal, the corresponding processing module 12 may know that the count of the counted clock transitions indicates the identifier (e.g., identifies the processing module 12 corresponding to received data). In some cases, the master processing module 12 may clock a logical high bit through the distributed processing system 10 during an initialization operation to determine a total number of processing modules 12 coupled via the ORC bus 56G. This may be permitted since the master processing module 12 may also count a number clock transitions used for the logical high bit to return.

In some embodiments, field programmable gate array, or other programmable (e.g., reprogrammable) logic devices or processing devices, are used to support the ORC bus 56G. These programmable logic devices may process transmitted data at higher frequencies and/or higher bandwidths and this may be used with the ORC bus 56G designed to have a relatively higher transmission frequency and/or bandwidth.

However, in some embodiments, the amount of processing power afforded from the programmable logic device may be excessive for the application, such as when a processing module 12 uses programmable logic device to process data at lower frequencies or bandwidths. In these cases, lower bandwidth and/or frequency processing circuitry, like an embedded processor and/or a central processing unit (CPU), may be used instead of or in addition to the programmable logic device. When the processing circuitry is used to supplement or replace the programmable logic device, a Serial Peripheral Interface (SPI) 104 may be included within the I/O block 16. The SPI 104 within the I/O block 16 may change configuration between a receive operation and a transmit operation. The I/O block 16 may be timed in a similar way to the communication interval 70, such that the I/O block 16 via the SPI 104 may automatically change from the receive operation to the transmit operation to communicate via the ORC bus 56G. For example, referring briefly back to FIG. 5, during the time period 72C, the processing module 12, "module 1" may have a I/O block 16 operating in the transmit operation while the I/O block 16 of "module 2" operates in the receive operation until the time period 72D. During time period 72D, "module 1" may operate in the receive operation and the "module 2" may operate in the transmit operation.

In some cases, the SPI 104 may change in response to a control signal from the master processing module 12. For example, the master processing module 12 may include a timer and/or counter circuitry and a lookup table to control a select signal that may be used to enable data transfer during the allocated duration of the communication interval 70. The select signal, not depicted, may transmit through an additional communicative coupling to each processing module 12 (e.g., the SPI 104 of each processing module 12) to permit the master processing module 12 to control the operational state of the SPI 104 via the select signal. In examples where a central processing device or the master processing module 12 controls permitting of communication of each processing module 12, addresses and/or addressing operations may not be used since the central processing device or the master processing module 12 controls data flow onto the ORC bus 56G.

The ORC bus 56G is shown with the drivers 58 included. It is noted that in some cases, single-ended differential-transmission is permitted by the ORC bus 56G and/or components of the ORC bus 56G. In these cases, it might be suitable to remove the drivers 58 and communicate data via the ORC bus 56G using single-ended transmission instead of or in addition to differential transmission. It is noted that although the clocked bit addressing method is shown in FIG. 10, any suitable addressing method may be combined with the depicted ORC bus 56G.

Figure 11:
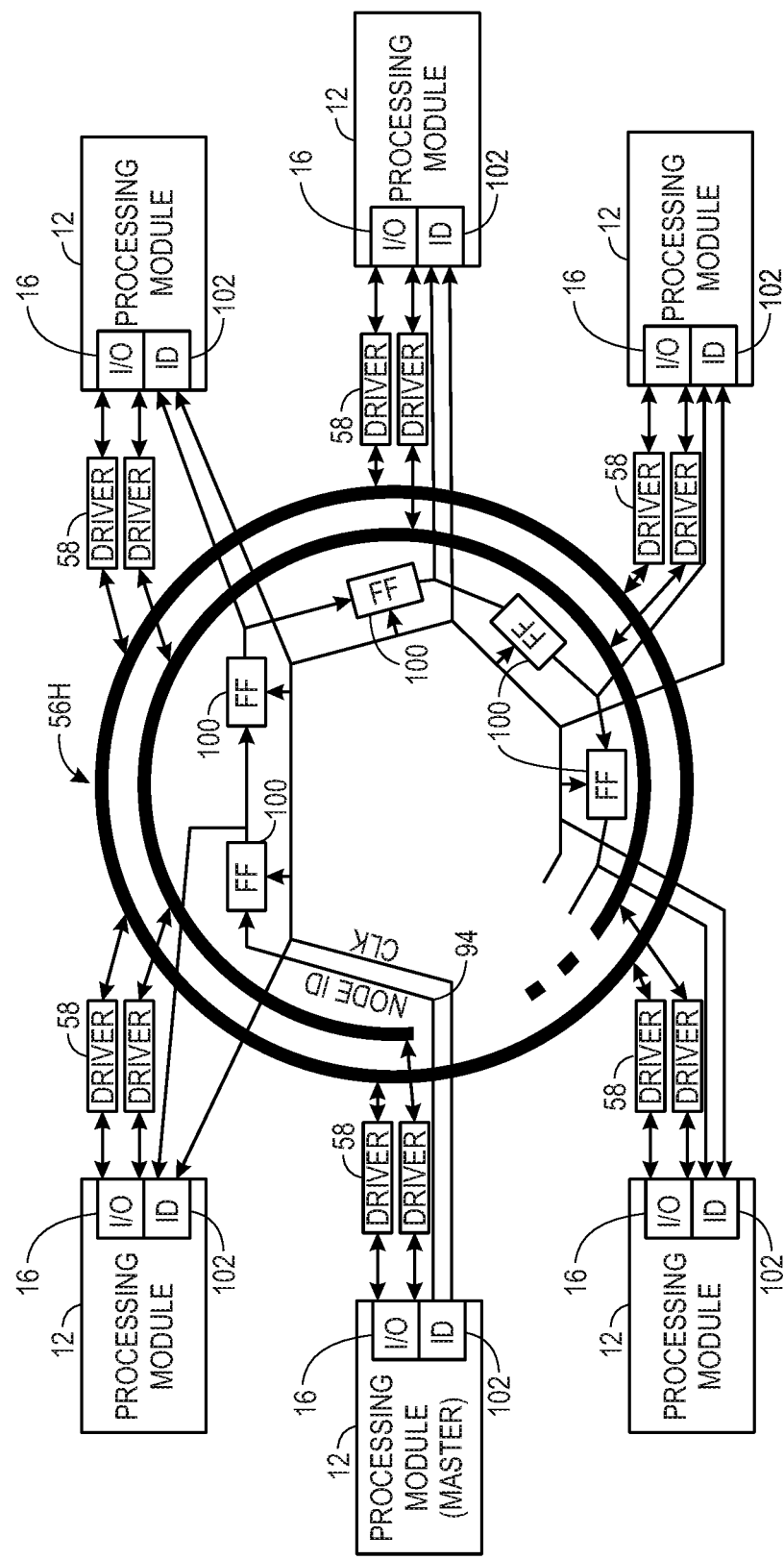
FIG. 11 is a block diagram of a seventh example of the open ring bus of FIG. 1, in accordance with an embodiment.

In some cases, additional drivers and rings are used with the ORC bus 56G. This is shown in FIG. 11, where FIG. 11 is a block diagram of an example ORC bus 56H that uses clocked bit addressing. The ORC bus 56H depicts two rings instead of just one ring, as shown in FIG. 10. To increase bandwidth of the ORC bus 56H, additional rings may be included with the one ring of FIG. 10. For example, one ring per processing module 12 may be used. As shown in FIG. 11, the ORC bus 56H may include six rings for six processing modules 12. When a ring is dedicated to a processing module 12, each module may transmit and/or receive data at the same time. The examples shown in FIG. 10 and FIG. 11 may have a half-duplex configuration. The ORC bus 56H also uses a clocked identifier to address the data sent via the ORC bus 56H, and operates in a similar manner as described with respect to FIG. 10.

Figure 12:
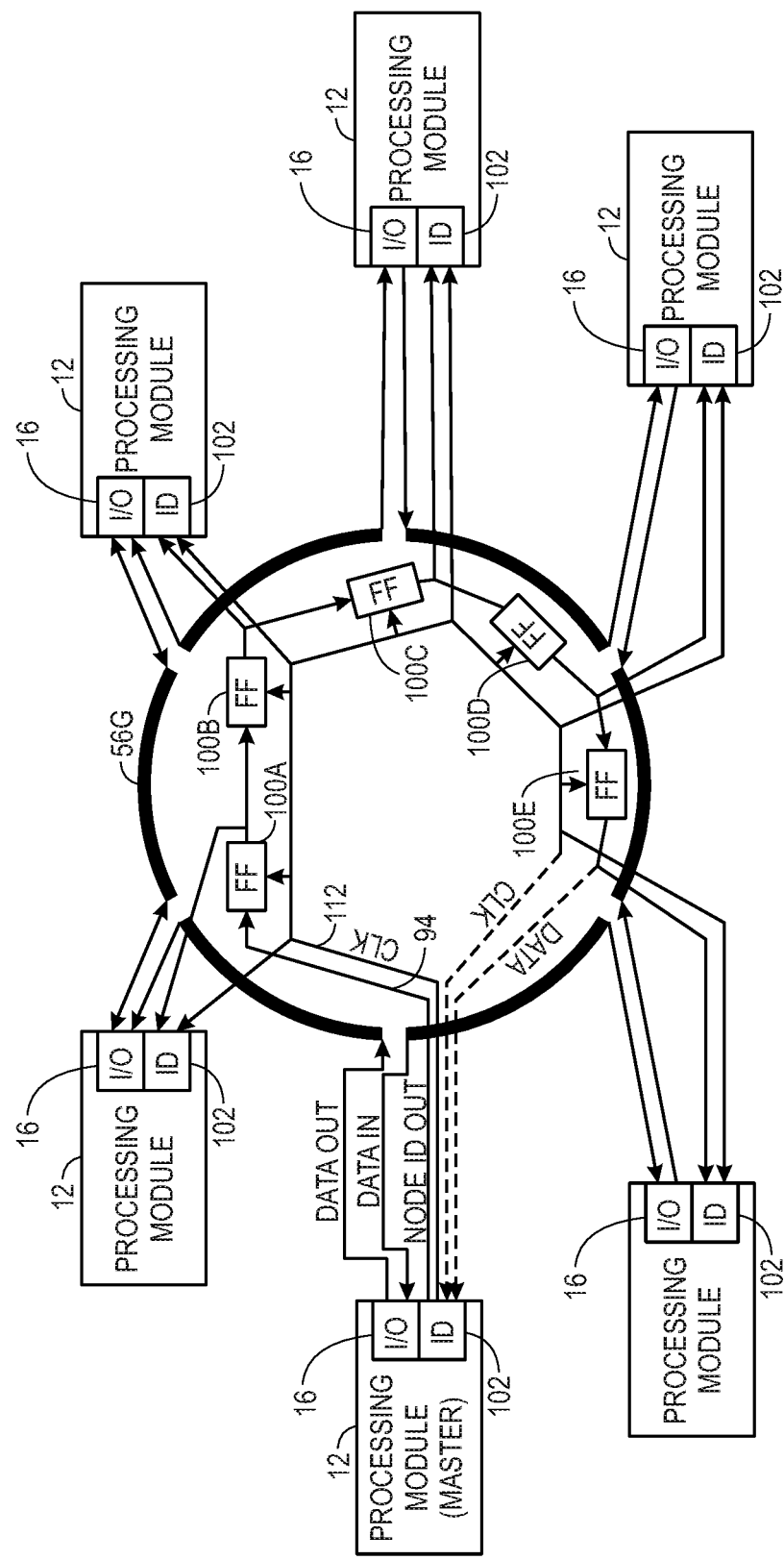
FIG. 12 is a block diagram of an eighth example of the open ring bus of FIG. 1, in accordance with an embodiment.

FIG. 12 is a block diagram of an example ORC bus 56I that uses clocked bit addressing. The ORC bus 56H has a repeater node configuration. In this way, instead of each processing module 12 coupling to the ORC bus 56I through the drivers 58, the ORC bus 56I terminates at the I/O blocks 16 of each processing module 12. In some examples, the I/O blocks 16 of each processing module 12 may interface via Ethernet or another communication protocol and/or data may be clocked in and out of each processing module 12. This example also uses a clocked identifier. The master processing module 12 may output data identifying which processing module 12 corresponds to a current data transmission. However, since there is a delay in the data being received by each processing module 12, the clocked identifier is also delayed. Flip flop circuitry 100 is included to delay the transmission of the clocked identifier to each of the processing modules 12.

To describe operation of the ORC bus 56I, at a beginning of the communication interval 70, each processing module 12 may generally output data to the ORC bus 56I for an adjacent processing module 12 to receive. The master processing module 12 may output data at a time corresponding to when the identifier for the master processing module 12 is transmitted to the first flip flop circuitry 100A. Subsequent transmission of the data through the processing modules 12 may align with the transmission of the identifier through the flip flop circuitry 100. The identifier may be associated with the data transmitted by each processing module 12 via the ORC bus 56I. The master processing module 12 may transmit the identifier from an identification (ID) terminal 102. The other processing modules 12 may read the identifier using outputs from the master processing module 12 via the ID terminal 102. The identifier may indicate to the processing module 12 a data source associated with an ongoing data transmission. The flip flop circuitry 100 may propagate the identifier to the next processing module 12.

Compared to the earlier described configurations, the ORC bus 56F may have reduced delays and/or latencies. For example, the ORC bus 56F has relatively less delay than the ORC bus 56I, since data transmitted via the ORC bus 56F transmits through fewer repeaters than data of the ORC bus 56I.

Figure 13:
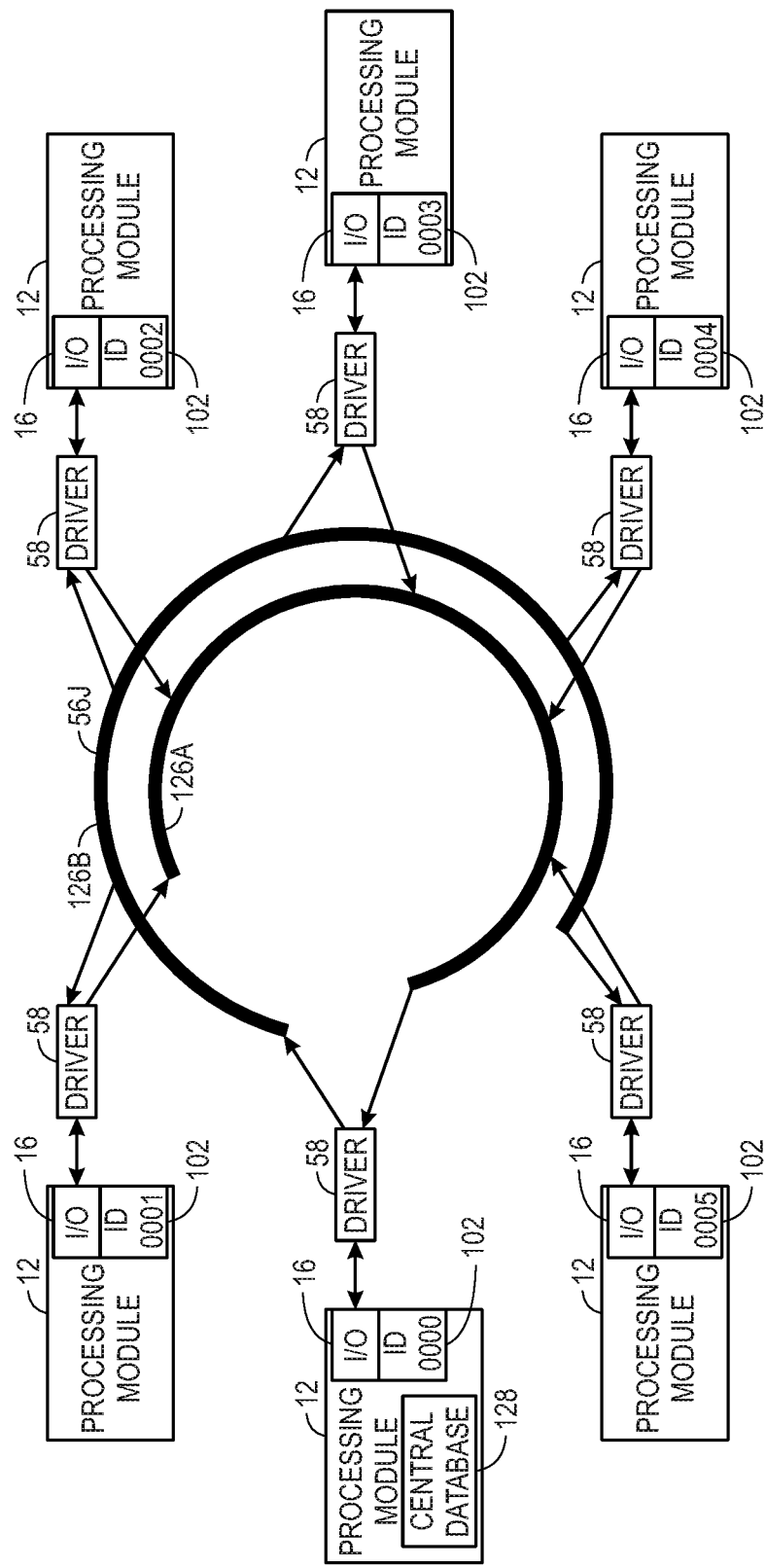
FIG. 13 is a block diagram of a ninth example of the open ring bus of FIG. 1, in accordance with an embodiment.

FIG. 13 is a block diagram of an example ORC bus 56J that uses fixed addressing. In this example, the processing modules 12 use fixed addresses and a dual ring bus 126 to communicate information between each other. The dual ring bus 126 has one ring for transmitting data (126A) and one ring for receiving data (126B). The dual ring bus 126 may be considered a full duplex ring bus, where a processing module 12 may receive and transmit data via at least partially simultaneous operations.

The master processing module 12 may be a central location for data storage since it is coupled to the end of the ORC bus 56J for both rings of the dual ring bus 126. The master processing module 12 may include a central database 128 or other suitable memory or storage circuitry (e.g., a storage component) for storing received data from the children processing modules 12. The master processing module 12 may communicate with devices and/or systems external to the distributed processing system 10 on behalf of the other processing modules 12 since the master processing module 12 centrally stores data transmitted via the ORC bus 56J. In some cases, the master processing module 12 may couple via a cloud connection or a wireless connection to a central database for storage of data. It is noted that this tenth example of the ORC bus 56J is a dual ring, fixed address embodiment.

With the foregoing in mind, in some embodiments, data transmitted onto the ORC bus 56 is sensitive data, or is data that is undesired to be accessed by unauthorized parties. In these cases, the data transmitted onto the ORC bus 56 may be encrypted by one processing module 12 and decrypted after reception by another processing module 12.

Furthermore, in some embodiments, the transmission frequency of the ORC bus 56 may increase to relatively high frequencies. As transmission frequencies reach speeds over 500 megahertz (MHz), dynamic adjustments may be used to account for the higher frequencies. For example, as transmission frequencies increase, clock pulse edges become relatively small. When this happens, a jitter rate of clock recovery circuitry (not depicted but understood to be part of the I/O blocks 16) and/or a bus length between a first processing module 12 and a last processing module may have an influence on clock timing. The clock recovery circuitry may use data from the ORC bus 56 to recover a clock signal for use by the processing module 12 when handling the data.

To train one of the processing modules 12, its clock recovery circuitry may be adjusted to detect a range of clock delays affecting the ORC bus 56. This adjustment may include advancing and/or retracting the timing of the clock recovery circuitry to determine the range of the clock delays. The training may determine these points and adjust the center to align the data with the clock. The training may be performed at the initiation of the system, such as during a calibration, and/or at a time during operation, such as during a recalibration. The master processing module 12 may, at power on, send test data to train the other processing modules 12. The clock recovery circuitry of the processing modules 12 may recover a clock signal using the test data while awaiting propagation of real, non-test data.

In some examples, a clock distribution device is used in combination with the described systems when operated at frequencies greater than 500 MHz. The clock distribution device may reduce or eliminate propagation delays of a clock transmitted from a first processing module 12 to a last processing module 12. A star clock distribution may be used in combination with the clock distribution device to transmit a clock simultaneously to at least two processing modules 12 via direct communicative couplings to reduce propagation delays.

Additionally or alternatively, in some examples, the ORC bus 56 may include a data integrity confirmation device that performs error checking operations. The error checking operations may be performed on each message (e.g., data or data packet transmitted) transmitted via the ORC bus 56 and/or on a subset of messages transmitted via the ORC bus 56. In this way, messages may be verified as valid after each transmission of the message, as to reduce a likelihood of a component of the industrial automation system 32 and/or of the industrial control system responding to an invalid message. The data integrity confirmation device may perform a cyclic redundancy check (CRC) operation (e.g., CRC-16 that uses a sixteen bit checksum to verify data integrity of a message) of a message transmitted via the ORC bus 56 to verify that a message transmitted from a first processing module 12 matches what is received by a second processing module 12.

Thus, technical effects of the present disclosure include leveraging an open ring communication bus (ORC bus) to improve communication between processing modules of a distributed processing system. The ORC bus architecture may permit an adjustable number of processing modules, an adjustable number of lanes, an adjustable number of rings, an adjustable frequency, adjustable data transmission intervals, an adjustable message size, or the like. In this way, the ORC bus architecture is adaptable to support different topologies while maintaining its efficient transmission. In addition to being a versatile system, the ORC bus may reduce or eliminate data latency of a distributed processing system.

While only certain features of the presently described embodiment have been illustrated and described herein, many modifications and changes will occur to those skilled in the art. It is, therefore, to be understood that the appended claims are intended to cover all such modifications and changes as fall within the true spirit of the presently described embodiment.

The invention claimed is:

1. A system, comprising:
a plurality of processing devices, wherein each processing device of the plurality of processing devices comprises a control application configured to perform an operation on a respective industrial automation component, and wherein the plurality of processing devices comprises a master processing device configured to generate an interrupt command interpretable by each of the plurality of processing devices; and
an open ring communication bus communicatively coupled to each of the plurality of processing devices, wherein each processing device of the plurality of processing devices track a respective timing interval of a plurality of time intervals, wherein the control application of each processing device is configured to communicate data related to the operation of the respective industrial automation component during the respective timing interval via the open ring communication bus, and wherein the interrupt command is received by a respective processing device of the plurality of processing devices before the respective timing interval.

2. The system of claim 1, wherein a first processing device of the plurality of processing devices is coupled to the open ring communication bus via a driver, wherein the driver is configured to convert additional data from a first type into a second type transmittable via the open ring communication bus.

3. The system of claim 2, wherein the first processing device of the plurality of processing devices operates in a transmission operational mode during a first respective timing interval of the plurality of time intervals, wherein a second processing device of the plurality of processing devices operates in a receive operational mode during the first respective timing interval, and wherein the first processing device transmits additional data to the second processing device through the open ring communication bus via the driver.

4. The system of claim 1, wherein the plurality of timing intervals is apportioned into a fast acquisition time period and a general transfer time period, wherein a first set of data categorized as a having a higher priority relative to other sets of data generated by a respective processing device of the plurality of processing devices is transmitted during the fast acquisition time period, and wherein a remaining portion of first set of data is transmitted during the general transfer time period.

5. The system of claim 1, wherein the respective timing interval is divided into a number of equal time durations based at least in part on a total number of the plurality of processing devices.

6. The system of claim 1, wherein the open ring communication bus comprises four lanes, and wherein each of the four lanes is communicatively coupled to each of the plurality of processing devices.

7. The system of claim 1, wherein the open ring communication bus comprises a number of rings equal to a total number of the plurality of processing devices.

8. The system of claim 1, wherein the open ring communication bus is communicatively coupled to a first processing device of the plurality of processing devices via a plurality of drivers.

9. A tangible, non-transitory, computer-readable medium comprising instructions that, when executed by a processor of a processing device comprising an input/output block, cause the processor to:
transmit a first control signal configured to cause the input/output block to operate in a transmission operational mode for at least a portion of a first transmission interval;
generate a first dataset according to a first data type, wherein the first transmission interval comprises a fast acquisition time period configured to communicate a second dataset having the first data type between a plurality of processing devices;
transmit, via the input/output block, the first dataset to an open ring communication bus while the input/output block is operating in the transmission operational mode, wherein the open ring communication bus is communicatively coupled to the plurality of processing devices, and wherein each processing device of the plurality of processing devices comprises a respective input/output block of a plurality of input/output blocks such that the plurality of processing devices receives the first dataset via the respective input/output block;
transmit a second control signal configured to cause the input/output block to operate in a receive operational mode for at least a portion of a second transmission interval;
generate a third dataset according to a second data type, wherein the second transmission interval comprises a general acquisition time period configured to communicate a fourth dataset having the second data type between the plurality of processing devices;
receive, via the input/output block, the third dataset from the open ring communication bus to the input/output block while the input/output block is operating in the receive operational mode; and
transmit a synchronizing pulse to each of the plurality of processing devices via the open ring communication bus, wherein the synchronizing pulse is configured to cause each of the plurality of processing devices to restart the first transmission interval.

10. The tangible, non-transitory, computer-readable medium of claim 9 comprising instructions that, when executed by the processor, cause the processor to:
program the input/output block to operate in the transmission operational mode, wherein the input/output block is configured to transmit while in the transmission operational mode for a first duration of time configured to be proportional to a second duration of time the input/output block is configured to receive while in the receive operational mode.

11. The tangible, non-transitory, computer-readable medium of claim 9 comprising instructions that, when executed by the processor, cause the processor to:
receive a fifth dataset from a child processing device of the plurality of processing devices during a third transmission interval of the first transmission interval, wherein the child processing device is configured to operate in the transmission operational mode while the input/output block is configured in the receive operational mode.

12. A system, comprising:
a plurality of processing devices comprising a first processing device and a second processing device, wherein the plurality of processing devices intercommunicate based at least in part on fixed addressing operations, clocked bit addressing, direct addressing, or any combination thereof, and wherein the first processing device comprises:
input/output circuitry; and
a control application configured to perform an operation on at least a portion of an industrial automation system; and
an open ring communication bus communicatively coupled to the first processing device via the input/output circuitry, wherein the first processing device tracks a respective timing interval of a plurality of time intervals, wherein the control application is configured to output data to the open ring communication bus related to the operation on the at least a portion of the industrial automation system during the respective time interval, wherein the first processing device comprises an identification terminal directly coupled to each of the plurality of processing devices, and wherein the first processing device is configured to receive an identifier for an ongoing data transmission associated with the open ring communication bus via the identification terminal.

13. The system of claim 12, wherein the first processing device comprises counter circuitry, wherein the first processing device tracks the respective timing interval of the plurality of time intervals via the counter circuitry.

14. The system of claim 12, wherein the first processing device comprises a storage component configured to store data output from the plurality of processing devices.

15. The system of claim 12, wherein the open ring communication bus comprises a full duplex ring communication bus, wherein one of the plurality of processing devices is configured to receive and transmit data via the full duplex ring communication bus.

16. The system of claim 12, wherein the open ring communication bus is configured to terminate at the first processing device.

17. A system, comprising:
a plurality of processing devices, wherein each processing device of the plurality of processing devices comprises a control application configured to perform an operation on a respective industrial automation component; and
an open ring communication bus communicatively coupled to each of the plurality of processing devices, wherein each processing device of the plurality of processing devices track a respective timing interval of a plurality of time intervals, and wherein the control application of each processing device is configured to communicate data related to the operation of the respective industrial automation component during the respective timing interval via the open ring communication bus, wherein a first processing device of the plurality of processing devices is coupled to the open ring communication bus via a driver, and wherein the driver is configured to convert additional data from a first type into a second type transmittable via the open ring communication bus, wherein the first processing device of the plurality of processing devices operates in a transmission operational mode during a first respective timing interval of the plurality of time intervals, wherein a second processing device of the plurality of processing devices operates in a receive operational mode during the first respective timing interval, and wherein the first processing device transmits additional data to the second processing device through the open ring communication bus via the driver.

18. A system, comprising:
a plurality of processing devices, wherein each processing device of the plurality of processing devices comprises a control application configured to perform an operation on a respective industrial automation component; and
an open ring communication bus communicatively coupled to each of the plurality of processing devices, wherein each processing device of the plurality of processing devices track a respective timing interval of a plurality of time intervals, and wherein the control application of each processing device is configured to communicate data related to the operation of the respective industrial automation component during the respective timing interval via the open ring communication bus, wherein the plurality of timing intervals are apportioned into a fast acquisition time period and a general transfer time period, and wherein a first set of data categorized as a having a higher priority relative to other sets of data generated by a respective processing device of the plurality of processing devices is transmitted during the fast acquisition time period, and a remaining portion of first set of data is transmitted during the general transfer time period.

\* \* \* \* \*